May 5, 1925. 1,536,397

A. KÉGRESSE

DRIVEN AND DRIVING PULLEY

Filed June 20, 1921   3 Sheets-Sheet 2

INVENTOR:
Adolphe Kégresse
BY
ATTORNEY

May 5, 1925.
A. KÉGRESSE
1,536,397
DRIVEN AND DRIVING PULLEY
Filed June 20, 1921    3 Sheets-Sheet 3
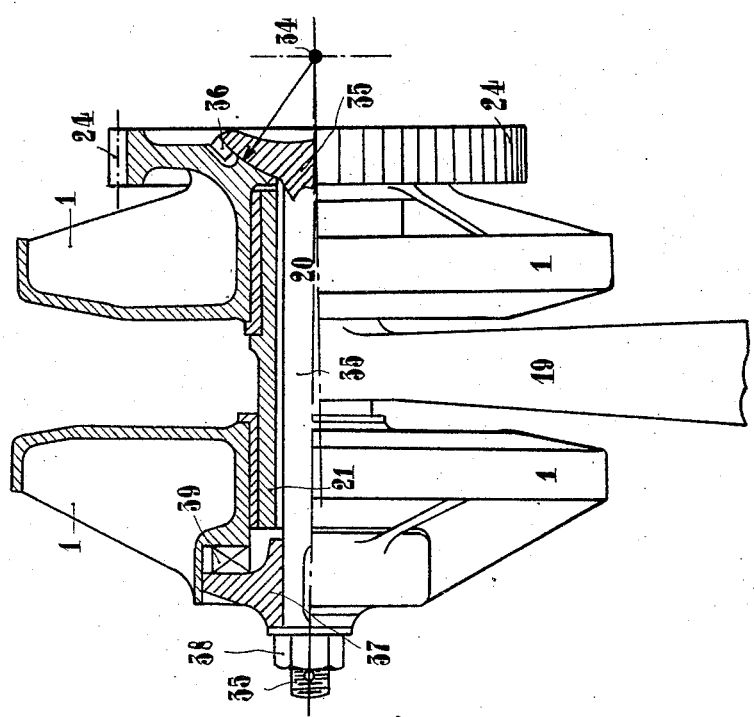
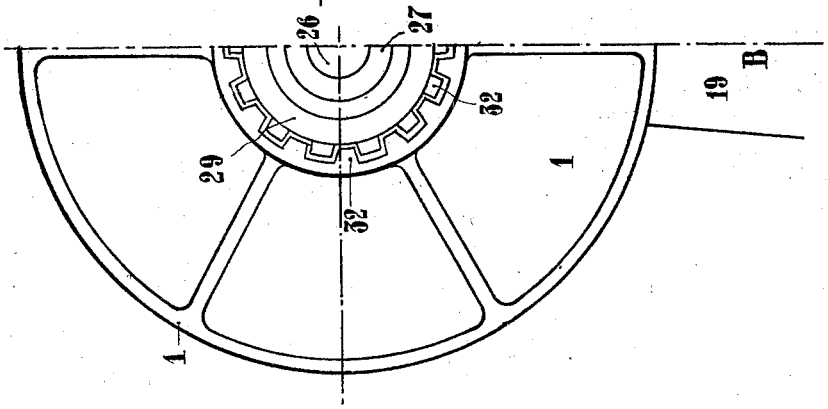
INVENTOR:
Adolphe Kégresse
BY
ATTORNEY Patented May 5, 1925.

1,536,397

UNITED STATES PATENT OFFICE.

ADOLPHE KÉGRESSE, OF PARIS, FRANCE.

DRIVEN AND DRIVING PULLEY.

Application filed June 20, 1921. Serial No. 479,019.

*To all whom it may concern:*

Be it known that I, ADOLPHE KÉGRESSE, citizen of the Republic of France, and resident of Paris, France, post-office address 28 Avenue de Courville, have invented new and useful Driven and Driving Pulleys, which improvements are fully set forth in the following specification.

It is known that in the transmission of power by means of trapezoidal belts, the coefficient of adhesion increases as the angle formed by the sides of the belt decreases. In other words, the smaller the angle in question, the better the belt jams and consequently the better the driving. It is therefore preferable in practice to employ trapezoidal belts, the sides of which form the smallest possible angle.

Unfortunately, if the said angle is brought below a certain value (about 30°), a "pinching" of the belt is produced in the grooves of the pulley, where it enters and leaves them. This pinching, which is very injurious to the belt itself, results moreover in reducing the efficiency of the transmission or drive to the point of rendering it entirely useless.

It is also known that for transmitting variable power, it may be advantageous to employ automatic clutch pulleys such as for instance that described in my prior application, No. 457,109, filed March 30, 1921.

The constructions of pulleys herein described and forming the subject of the present invention, have mechanisms designed so as to make it possible to obtain, when using trapezoidal belts of any angle, the automatic clutch action above referred to.

Fig. 3 is a half-elevation of the pulley shown in Fig. 2.

Fig. 4 is a sectional elevation of a second modification.

Each pulley is constituted by two half-pulleys 1. Each half-pulley can be mounted with a slight amount of friction on its spindle, or rotate with the same. In all the cases, the spindles of the half-pulleys are not parallel but intersect at a point, the position of which can vary.

It will be readily understood that the cheeks of the two half-pulleys rotating on intersecting spindles, which form the groove, are not parallel, the result being that the belt is wedged or jammed on a fairly small portion of circumference, so that the points where it enters and leaves the pulley are absolutely free, and there is even a certain play depending on the angle which the spindles will make with each other. Any injurious pinching is therefore completely eliminated thereby.

Figure 1:
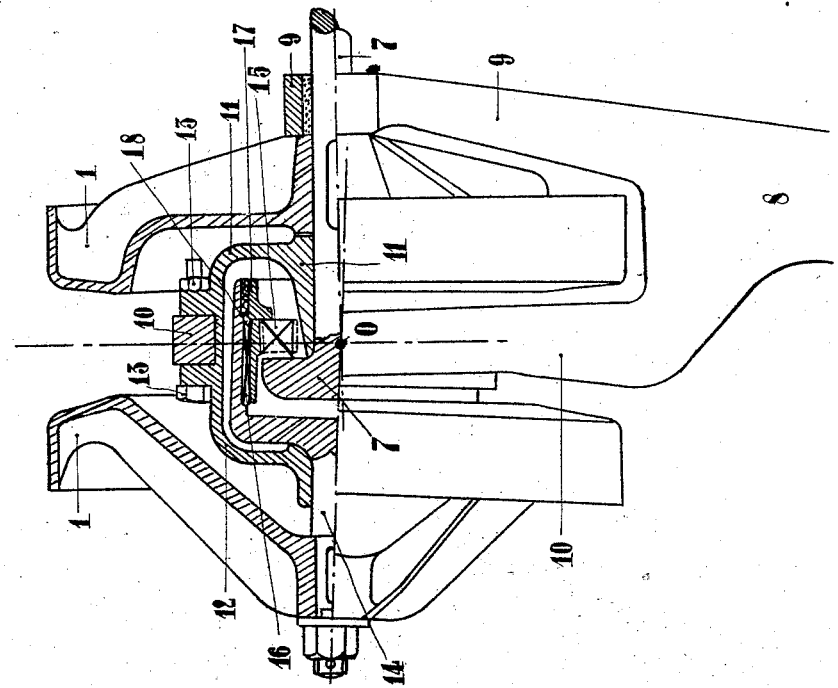
Figure 1 is a front elevation, half in section, of one form of the invention, combining the automatic clutching action with the necessary obliquity of the two component members or halves of the pulley relative to each other.

The driving spindle 7 (Figure 1) takes up the force to be transmitted either directly or through a well known part: gear wheel, chain wheel etc. This spindle is supported by a bracket in the form of a fork 8 with two branches, the outer branch 9 of which affords free passage, but without play, to the driving spindle 7. The inner branch 10 forms a fixed base for the circular casing in two parts 11 and 12; the whole is rigidly connected together by bolts 13. The part 11 of the said casing affords a free passage, but without play, to the driving spindle 7, for which it forms a second support; the first one being constituted by the branch 9 of the fork 8. Between the half 11 of the circular casing and the branch 9 is keyed to the spindle 7 the driving half-pulley. The other part 12 of the circular casing forms a support for a secondary spindle 14. The latter is not parallel to the driving spindle 7. The extensions of these two spindles intersect each other at the point O. On the outer end of the spindle 14 is keyed the other half-pulley.

The spindles 7 and 14 of the two half-pulleys not being parallel, the cheeks of the latter are not parallel either. The jamming above referred to, is therefore obtained, whilst at the same time the belt is free at the point of entering and leaving the pulley.

Figure 5:
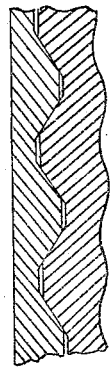
Fig. 5 shows the inclined clutch surfaces developed.

The primary spindle 7 terminates at the inner end in a head carrying a set of teeth 15 with inclined faces of special cross-section, the diagrammatic development of which, shown in my above identified application (see Figure 12 thereof), is reproduced here in Figure 5. The secondary spindle 14 terminates, at the inner end, in a large recess affording a seat, with a suitable play, for the head of the primary spindle 7. This recess is provided with inner grooves 16 to which is secured, by means of the inner nut 17, a rim 18 carrying teeth with inclined faces, corresponding to the teeth 15 of the head of the primary spindle 7.

By observing that the secondary spindle 14 and the corresponding half-pulley can move laterally in the casing member 12, it will be easy to understand the working of the said pulley: the primary spindle 7 drives, with the constant speed of the motor, the half-pulley keyed to it. The secondary spindle 14 and the half-pulley corresponding to it, are driven through the coacting teeth 15 and 18, the effect of which, is to produce automatic clutching.

Figure 2:
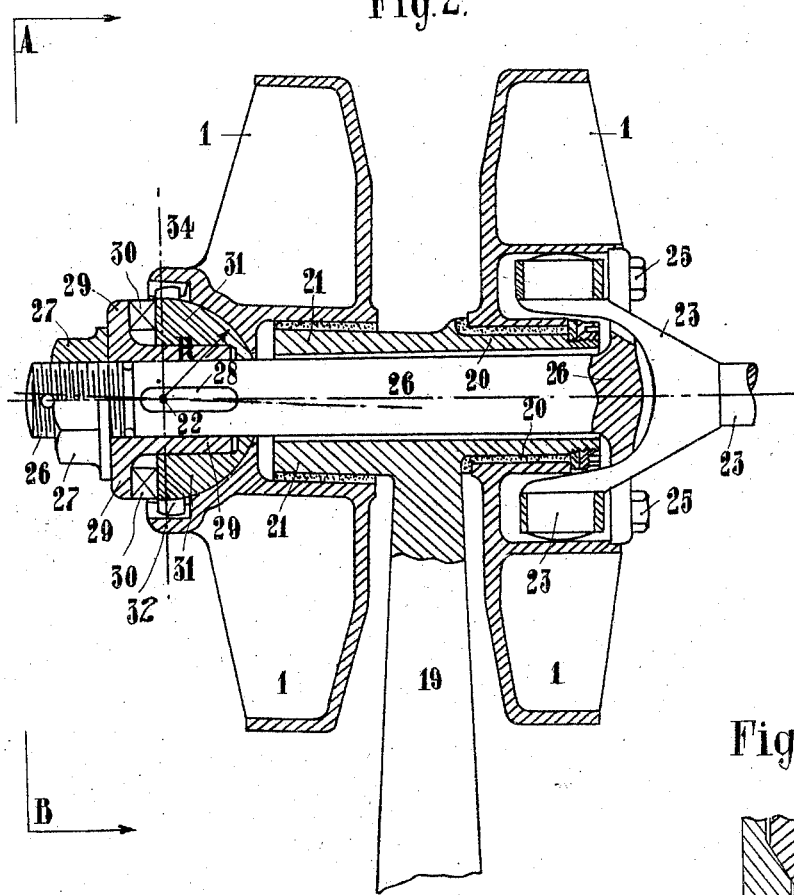
Fig. 2 is a modification, partly in section and partly in elevation.

It will be seen from the preceding description that as the two sets of teeth are secured to spindles, the axes of which intersect each other, they cannot come in contact throughout the whole of their diameter. This defect which may have drawbacks for transmission of high power, is eliminated in the following construction (Figure 2).

The two half-pulleys are mounted loose and without play on the bracket 19 (Figure 2), the hollow head of which is constituted by two trunnions 20 and 21. The axes of the said trunnions are not parallel, but intersect each other at the point 22. The desired jamming of the belt in the groove of the pulleys is therefore obtained in the desired limits.

The driving half-pulley could be driven in various manners: by a Cardan joint 23 (Figure 2), by a gear wheel 24 (Figure 4), by a worm, a chain wheel etc. etc.

To the driving pulley is rigidly secured, by means of bolts 25 (Figure 2), the secondary spindle 26 terminating for the purpose in a disc to suit the method of driving. The spindle 26 passes with a suitable play right through the head 20—21; it terminates at the end opposite to the attaching disc, in a screwthreaded portion with a nut 27 preceded by keyways or grooves 28 to receive keys (not shown) on head 29, the whole being intended for locking said head 29, the latter carrying teeth 30 with inclined faces (Figure 2).

On the cylindrical portion of the head 29 is mounted with a slight amount of friction a semi-spherical part 31 with a radius R, the centre of which is at the point of intersection 22 of the spindles of the half-pulleys. This part 31 is provided with teeth with inclined faces engaging with the teeth 30 of the head 29. It has further on its larger diameter another set of teeth 32 (Figures 2 and 3) of special shape intended to drive the second half-pulley, which latter is provided in its turn with a set of inner teeth corresponding to the teeth 32. The lateral pressure due to the wedging of the belt always keeps the hollow semi-spherical part of the secondary pulley in engagement with the corresponding portion of the part 31.

The working of this pulley is as follows:

The spindle 26 driven with the primary half-pulley transmits its movement of rotation to the semi-spherical part 31 through the teeth 30. This movement is transmitted to the secondary half-pulley through the teeth 32 which have the necessary shape and sufficient play to enable them to execute a movement relatively to each other, due to the inclination of the spindles of the parts in contact.

In the present case, the inclined faces will bear on the whole of their circumference, since the two parts in contact are mounted on each other, and therefore have one and the same axis.

The lateral pressure above referred to, will be normally taken up by the semi-spherical parts provided for the purpose. The centre of these semi-spheres being in the intersection 22 of the spindles, it follows that the semi-spherical surfaces in contact will absorb, by a normal friction, the relative movement of the secondary pulley and of the part 31, both mounted on different spindles intersecting at 22, as already stated.

A suitable lateral play enables the secondary half-pulley and the semi-spherical part 31 supporting it to move to the desired length under the action of the teeth, and thus to produce the automatic clutching action.

Figure 4 shows by way of example a modified construction of the system hereinbefore described.

As before, the two half pulleys rotate about the head of the support 19 forming the hollow trunnions 20 and 21, the axes of which intersect at the point 34 (Figure 4) which forms the fixed centre for the radius R (same figure). The secondary spindle 35 terminates, at the side of the point 34, in a head with teeth 36 similar to the teeth 32 of Figures 2 and 3. These teeth 36 (Figure 4) engage with a suitable play with the corresponding teeth provided on the driving half-pulley, and drive the secondary spindle 35. The inner face of the head of the said spindle is rounded in accordance with the radius R of the centre 34. It is against this round surface that presses the corresponding part of the driving pulley. The other end of the spindle 35 engages with the secondary half-pulley by means of a plate 37 keyed to the spindle 35 and held in place by a nut 38. The head 37 has teeth 39 with inclined faces which engage with the corresponding projections secured to the secondary half-pulley. The working of the said pulley is the same as that of the pulley previously described.

The supports of the pulley described could be of course varied, whilst retaining the same arrangements in principle.

I claim as my invention:—

1. A pulley for belts of trapezoidal section, comprising two independent half-pulleys mounted for rotation about intersecting, inclined axes, said half-pulleys being maintained in spaced relation to each other throughout their entire extent but inclined toward each other to grip the sides of the belt between them; mechanical means, other than the belt itself, for directly driving one half-pulley from a motor; and a driving connection between said half-pulley and the other half-pulley embodying a spindle provided with a head having a set of inclined teeth thereon, and a set of inclined teeth on said other half-pulley coacting with the first set.

2. A pulley for belts of trapezoidal section, comprising two independent half-pulleys mounted for rotation about intersecting, inclined axes, said half-pulleys being maintained in spaced relation to each other throughout their entire extent but inclined toward each other to grip the sides of the belt between them; mechanical means, other than the belt itself, for directly driving one half-pulley from a motor; and a driving connection for transmitting the rotation of the half-pulley so driven to the other half-pulley, said driving connection including a hemi-spherical member associated with one of the half-pulleys and fitting in a hemi-spherical socket in that half-pulley, the hemi-spherical member and its socket having inter-engaging teeth.

3. A pulley for belts of trapezoidal section, comprising two independent half-pulleys mounted for rotation about intersecting, inclined axes, said half-pulleys being maintained in spaced relation to each other throughout their entire extent but inclined toward each other to grip the sides of the belt between them; mechanical means, other than the belt itself, for directly driving one half-pulley from a motor; and a driving connection for transmitting the rotation of the half-pulley so driven to the other half-pulley, said driving connection including a spindle provided with a hemi-spherical head which fits in a hemi-spherical socket in one of the half-pulleys, the hemi-spherical head and its socket having inter-engaging teeth.

In testimony whereof I have signed this specification in the presence of two subscribing witnesses.

ADOLPHE KÉGRESSE.

Witnesses:
FERNAND DUFOUR,
CHARLES LÉON LOISEL.